United States Patent [19]
Robichaud

[11] 3,865,099
[45] Feb. 11, 1975

[54] MEDICAL ELECTRODE AND METHOD OF MAKING

[75] Inventor: Robert H. Robichaud, Attleboro, Mass.

[73] Assignee: Texas Instruments Incorporated, Dallas, Tex.

[22] Filed: May 18, 1973

[21] Appl. No.: 361,683

[52] U.S. Cl. ......... 128/2.1 E, 128/2.06 E, 128/417, 128/DIG. 4
[51] Int. Cl. .............................. A61b 5/04
[58] Field of Search ............ 128/2.06 E, 2.1 E, 417, 128/418, DIG. 4; 29/630 R

[56] References Cited
UNITED STATES PATENTS

| | | | |
|---|---|---|---|
| 3,187,745 | 6/1965 | Baum et al. | 128/2.06 E |
| 3,487,827 | 1/1970 | Edmark | 128/2.06 E |
| 3,545,432 | 12/1970 | Berman | 128/2.06 E |
| 3,572,323 | 3/1971 | Yuan | 128/2.06 E |
| 3,747,590 | 6/1971 | Motley | 128/2.06 E |

Primary Examiner—William E. Kamm
Attorney, Agent, or Firm—Harold Levine; John A. Haug; James P. McAndrews

[57] ABSTRACT

A medical electrode unit has a dielectric body with an open-ended body cavity and has a body step dividing the cavity into a small portion holding an electrode and a larger portion at the open cavity end. A porous organic pad is fused to the body step over the electrode and electrolyte paste fills the body cavity, the paste being forced through the porous pad and forming a paste mound at the cavity end. Adhesive on the body, which can be used to mount the electrode unit on a patient, holds a cover over the cavity in contact with the paste mound so that, when the cover is removed, a moist electrolyte surface free of hard crystals is exposed to be contacted with the patient.

8 Claims, 3 Drawing Figures

MEDICAL ELECTRODE AND METHOD OF MAKING

Medical electrode units which are prefilled with electrolyte paste for permitting the electrode unit to be mounted on a patient's skin with speed and convenience in emergency situations have been known for some time. In these prefilled electrodes, a conductive electrode element is disposed within a cavity in a dielectric body to be held in spaced relation to the patient's skin when the unit is mounted on the patient's skin. A foam pad filled with electrolyte paste is then disposed in the cavity for retaining the electrolyte paste in position between the conductive element and the open end of the cavity. When use of this unit is required, the cover is removed from the unit, the dielectric body is secured to the patient's skin, and a lead from an electrocardiograph or other physiological measuring apparatus is secured to the conductive electrode element for receiving electrical signals from the patient's skin as will be understood. However, it is found that, when the cover is removed from the electrode unit prior to use, pulling off of the cover occasionally causes the foam pad also to be pulled out of the cavity in the dielectric body. If the cover is spaced from the paste-filled foam pad in the electrode unit to avoid pulling the pad out of the cavity when the cover is removed, the surface of the electrolyte paste can become crystallized and can leave a rough, not very moist paste surface to be contacted with the patient's skin. Similarly, where the foam pad rests against the conductive electrode element in the body cavity, any drying out of the electrolyte paste during storage of the unit can cause the paste to be retracted from the conductive element into the foam pad limiting wetting of the conductive element with the electrolyte paste.

It is an object of this invention to provide a novel and improved medical electrode unit; to provide such a unit which is prefilled with electrolyte paste; to provide such a unit which has a cover for preventing drying out of the electrolyte paste and for keeping the paste clean; to provide such medical electrode units in which the cover is readily removed without risk of removing excessive electrolyte paste from the unit, in which removal of the cover provides a moist electrolyte paste surface free of paste crystals to be contacted with a patient's skin, and in which the conductive electrode element in the unit remains moistened with the electrolyte paste; to provide a novel and improved method for making such medical electrode units; and to provide such a method in which the component parts of the unit are easily, economically and reliably assembled.

Other objects, advantages and details of the novel and improved medical electrode unit and method for making the unit as provided by this invention appear in the following detailed description of preferred embodiments of the invention, the detailed description referring to the drawings in which.

Figure 1:
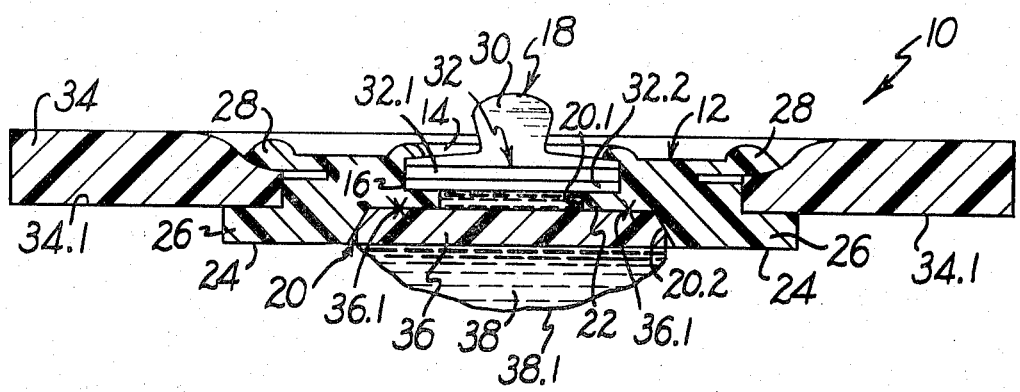
FIG. 1 is a transverse section view through an intermediate product provided by this invention illustrating a step in the method of this invention.
Figure 2:
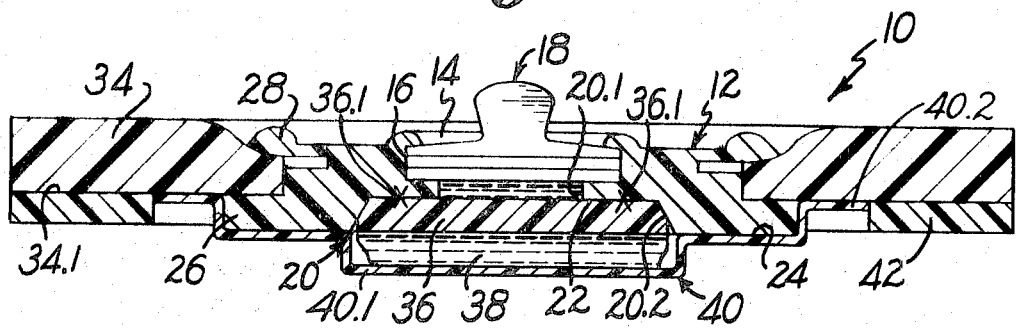
FIG. 2 is a transverse section view through the medical electrode unit provided by this invention.
Figure 3:
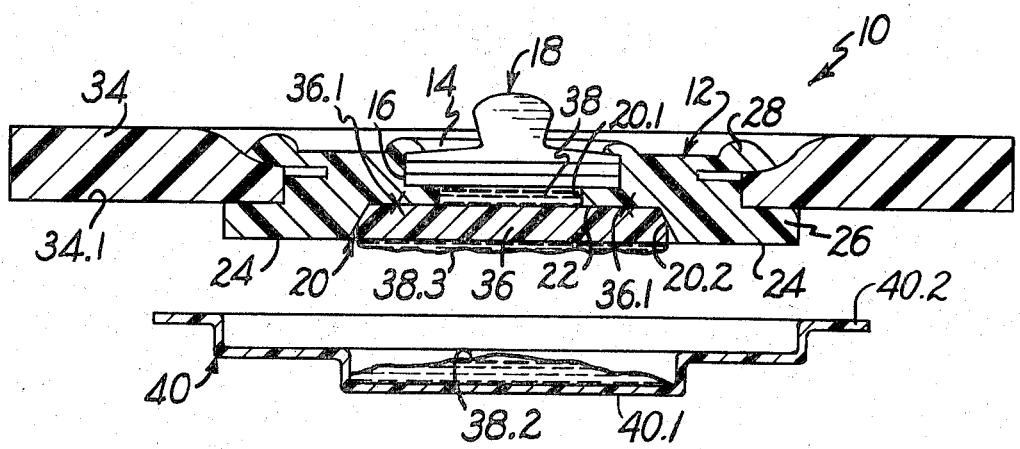
FIG. 3 is a transverse section view similar to FIG. 2 illustrating use of the medical electrode unit of this invention.

Referring to the drawings, 10 in FIGS. 1-3 indicates the novel and improved medical electrode unit of this invention. In a preferred embodiment of the invention, the medical electrode unit includes a generally round, disc-like body 12 of a somewhat resilient but shape-retaining, organic, dielectric material such as a medium-to-high impact polystyrene material. The dielectric body preferably has a central bore 14 and has an annular groove 16 formed in the bore. An electrically conductive electrode element 18 is secured in the groove 16. In this way, the electrically conductive element 18 and the body 12 cooperate to form a cavity 20 in the dielectric body which is open at one end of the cavity, the body having a step surface 22 dividing this body cavity into a relatively small diameter portion 20.1 adjacent the conductive element 18 and a relatively larger diameter portion 20.2 adjacent the open end of the cavity. The body also forms a rim 24 around the open end of the body cavity and the edge of the body is provided with two flaps 26 and 28 which preferably extend around the entire periphery of the body.

In a preferred embodiment of this invention, the electrically conductive element 18 includes a male snap-fastener member 30 preferably formed of brass which is plated with nickel and which is over-plated with silver. The electrically conductive element 18 also preferably includes a disc-like element 32 of a composite metal laminate material having a layer 32.1 of fine silver or of a relatively hard alloy of high silver content metallurgically bonded to a layer 32.2 of silver chloride, the composite element 32 being welded or otherwise secured in electrically conductive relation to the snap-fastener member 30. However, the electrically conductive element 18 could also comprise any other conductive electrode element structure conventionally employed in medical electrode units within the scope of this invention.

In a preferred embodiment of this invention, a ring of elastic, porous, organic foam material 34 is secured around the edge of the dielectric body 12, the foam member 34 preferably having a layer of a pressure-sensitive adhesive (not shown) on the surface 34.1 of the foam ring. Typically, for example, the foam ring 34 is formed of a polyurethane or polyethylene foam or the like and the pressure-sensitive adhesive comprises a medical grade acrylic adhesive such as is conventionally used in medical electrode units. The foam ring 34 is desirably secured to the dielectric body 12 by fitting the ring between the body flaps 26 and 28 around the entire periphery of the body and by heat-fusing the flap material and the foam ring together.

In accordance with this invention, a pad 36 of a porous, resilient, organic foam material is secured within the body cavity 20 as by heat-fusing portions of the foam pad to the step surface 22 of the dielectric body as indicated at 36.1 so that the foam pad substantially fills the larger diameter portion of the body cavity, disposing the foam pad 36 in selected spaced relation to the electrically conductive element 18 and disposing one surface of the foam pad closely adjacent to the open end of the body cavity 20 as shown. That is, the foam pad is secured within the cavity so that one surface of the pad is disposed flush with the open end of the cavity, is disposed just inside the open end of the cavity, or is disposed a selected distance outside the open end of the cavity as desired. Preferably, the foam pad is formed of reticulated polyurethane foam, a foam material which is substantially free of the closed cells so that the pores in the foam pad each extend entirely through the pad.

In accordance with the method of this invention, an electrolyte paste 38 is forced through the foam pad 36 in any conventional manner for filling the body cavity portion 20.1 and for fully wetting the conductive element 18, for filling the foam pad 36, and for forming a mound of the electrolyte paste on top of the pad as indicated at 38.1 in FIG. 1. A generally disc-shaped cover 40 formed of polystyrene material or the like is then secured over the body cavity 20 and is removably held against the body 12 in any conventional manner so that the cover flattens the mound 38.1 of the electrolyte paste into engagement with the cover 40 over substantially the entire surface of the foam pad 36, preferably without engaging the cover with the foam pad 36. Typically, for example, the cover 40 is provided with a domed portion 40.1 and with a flange 40.2, the flange 40.2 being releasably secured to the surface 34.1 of the foam ring 34 by means of the adhesive provided on that foam ring surface. Desirably the portion of this adhesive coated surface 34.1 not adhered to the cover flange 40.2 is releasably adhered to a protective paper ring 42 such as the conventional, bleached, silicon-coated release paper conventionally used for protecting such pressure-sensitive adhesive coatings. The electrolyte paste 38 utilized in the medical electrode unit 10 preferably comprises a lanolin-based sodium chloride solution or other electrolyte cream or paste material conventionally used in medical electrode units.

In this arrangement, where use of the medical electrode unit 10 is required, the paper ring 42 is peeled from the adhesive coated surface 34.1 of the foam ring 34. The cover 40 is then also peeled from the adhesive coated surface 34.1. The adhesive-coated surface 34.1 of the foam ring is then adhered to the skin of the patient and the conductive element 18 is electrically connected to a lead of an electrocardiograph apparatus or the like as will be understood. As the cover 40 is pulled from the electrode unit 10, some of the electrolyte paste 38 remains adhered to the cover and is pulled away from the electrode unit as indicated at 38.2 in FIG. 3 leaving peaks of the electrolyte paste extending out of the open end of the body cavity as indicated at 38.3 in FIG. 3. If any of the electrolyte paste has tended to crystallize at the surfaces of the body of the paste material during storage of the electrode unit prior to use, pulling of some of the paste from the electrode unit with the cover 40 assures that a fresh, moist surface of the paste, free of any paste crystals, is disposed at the open end of the body cavity ready to achieve good wetting of the patient's skin when the electrode unit is secured to the patient's skin. As one surface of the pad 36 is disposed adjacent the open end of the body cavity, there is assurance that removal of the cover 40 does not remove an excessive amount of the electrolyte paste from the electrode unit. Further, the foam pad 36 is positively secured within the body cavity 20 so there is no risk that removal of the cover 40 can cause the foam pad 36 to be pulled from the cavity. In addition, because the foam pad 36 is spaced from the conductive electrode element 18, any tendency for the electrolyte paste 38 to be retracted from the electrode element into the pores of the foam pad 36 during storage of the medical electrode unit is avoided, thereby assuring that the electrolyte paste remains in wetting relation to the conductive element.

It should be understood that, although particular embodiments of the electrode unit and method of this invention have been described by way of illustrating the invention, various modifications and equivalents of the described embodiments are within the scope of this invention. For example, the foam ring 34 can be omitted and adhesive means can be applied directly to the rim 24 of the dielectric body within the scope of this invention. Alternately, the conductive electrode unit 18 comprises a metal disc disposed at the base of a cavity 20 formed in the dielectric body and is electrically connected to a flexible lead which extends from the disc exteriorly of the dielectric body. This invention includes all modifications and equivalents of the disclosed embodiments falling within the scope of the appended claims.

I claim:

1. A medical electrode unit comprising a dielectric body having a cavity therein which is open at one end, said body having a step surface within said cavity forming a relatively small cavity portion spaced from said open cavity end and a relatively larger cavity portion adjacent said open cavity end, means secured to said body around said open cavity end for securing the electrode unit to a patient, a conductive electrode element disposed within said relatively smaller cavity portion spaced from said step surface, said electrode element having means extending away from said cavity out of said dielectric body for permitting electrical connection to be made to the electrode element, a resilient, dielectric foam pad having pores extending therethrough secured to said step surface of said body within said relatively larger cavity portion in spaced relation to said conductive electrode element and having a surface of said pad extending adjacent said open cavity end, electrolyte paste filling said relatively smaller cavity portion in wetting relation to said conductive electrode element, filling said pores of said foam pad, and forming a mound of said electrolyte paste on said pad outside said cavity, and a cover releasably secured against said dielectric body over said open cavity end, said cover having a surface engaging said electrolyte paste over substantially all of said open cavity end.

2. A medical electrode unit comprising a dielectric body having a cavity therein which is open at one end, said body having a step surface within said cavity forming a relatively small cavity portion spaced from said open cavity end and a relatively larger cavity portion adjacent said open cavity end, said body having a rim portion around said open cavity end, adhesive means on said body for securing said body rim against a patient's skin, a conductive electrode element disposed within said relatively smaller cavity portion spaced from said step surface, said electrode element having means extending away from said cavity out of said body for permitting electrical connection to be made to the electrode element, a resilient, dielectric foam pad having pores extending therethrough secured to said step surface of said body within said relatively larger cavity portion in spaced relation to said conductive electrode element and having a surface of said pad extending adjacent said open cavity end, electrolyte paste filling said relatively cavity portion in wetting relation to said conductive electrode element, filling said pores of said foam pad, and forming a mound of said electrolyte paste on said pad outside said cavity, and a cover releasably held by said adhesive means against said dielectric body over said open cavity end, said cover having a surface engaging said electrolyte paste over substantially all of said open cavity end.

3. A medical electrode unit comprising a dielectric body having a bore extending therethrough, a conductive electrode element disposed within said bore and cooperating with said dielectric body to form a cavity which is open at one end, said electrode element having a portion extending away from said cavity out of said body for permitting electrical connection to be made to the electrode element, said dielectric body having a step surface within said cavity dividing said cavity into a relatively small cavity portion adjacent said conductive electrode element and a relatively larger cavity portion adjacent said open cavity end, said body having a rim portion around said open cavity end, adhesive means on said body for securing said body against a patient's skin, a resilient, dielectric foam pad having pores extending therethrough secured to said step surface of said body within said relatively larger cavity portion in spaced relation to said conductive electrode element and having a surface of said pad extending adjacent open cavity end, electrolyte paste filling said relatively smaller cavity portion in wetting relation to said conductive electrode element, filling said pores of said foam pad, and forming a mound of said electrolyte paste on said pad outside said cavity, and a cover releasably held by said adhesive means against said dielectric body over said open cavity end, said cover having a surface engaging said electrolyte paste over substantially all of said open cavity end.

4. A medical electrode unit as set forth in claim 3 wherein said conductive electrode element embodies a male snap-fastener portion disposed in said bore in said dielectric body opposite said cavity.

5. A medical electrode unit as set forth in claim 3 wherein said form pad is formed of reticulated polyurethane foam.

6. A medical electrode unit as set forth in claim 3 wherein said adhesive means comprises an adhesive-coated, elastic, foam ring secured around the periphery of said dielectric body in surrounding relation to said open cavity end.

7. A method for making a medical electrode unit improving the steps of providing a dielectric body having an open-ended cavity therein, having a conductive electrode element disposed in said cavity spaced from said open cavity end and having a stepped surface dividing said cavity in a relatively smaller cavity portion adjacent said conductive element and a relatively larger cavity portion adjacent said open cavity end, securing a resilient dielectric foam pad having pores extending therethrough to said stepped surface in spaced relation to said conductive element with a surface of said pad disposed adjacent said open cavity end, forcing an electrolyte paste through said pad to fill said cavity and to form a mound of said paste on said pad outside said cavity, and securing a cover against said body for flattening said mound of electrolyte paste to engage a surface of said cover with said paste over substantially all of said open cavity end.

8. A method as set forth in claim 7 wherein said foam pad material is secured to said stepped body surface by heat-fusing said pad to said body surface.

* * * * *